(12) United States Patent
Boyce et al.

(10) Patent No.: US 12,264,715 B2
(45) Date of Patent: Apr. 1, 2025

(54) BRAKE PAD BACKING PLATE

(71) Applicant: FEDERAL-MOGUL MOTORPARTS LLC, Southfield, MI (US)

(72) Inventors: Christopher L. Boyce, Yellow Spring, WV (US); Gregory M. Vyletel, Ann Arbor, MI (US)

(73) Assignee: FEDERAL-MOGUL MOTORPARTS LLC, Southfield, MI (US)

( * ) Notice: Subject to any disclaimer, the term of this patent is extended or adjusted under 35 U.S.C. 154(b) by 875 days.

(21) Appl. No.: 17/284,531

(22) PCT Filed: Oct. 11, 2019

(86) PCT No.: PCT/US2019/055811
§ 371 (c)(1),
(2) Date: Apr. 12, 2021

(87) PCT Pub. No.: WO2020/077191
PCT Pub. Date: Apr. 16, 2020

(65) Prior Publication Data
US 2021/0381562 A1 Dec. 9, 2021

Related U.S. Application Data

(60) Provisional application No. 62/782,335, filed on Dec. 19, 2018, provisional application No. 62/744,922, filed on Oct. 12, 2018.

(51) Int. Cl.
*F16D 65/092* (2006.01)
*F16D 69/04* (2006.01)

(52) U.S. Cl.
CPC ....... *F16D 65/092* (2013.01); *F16D 69/0408* (2013.01); *F16D 2069/0441* (2013.01);
(Continued)

(58) Field of Classification Search
CPC .. F16D 69/04; F16D 69/0408; F16D 69/0416; F16D 69/0425; F16D 2069/0441;
(Continued)

(56) References Cited

U.S. PATENT DOCUMENTS

| | | | | |
|---|---|---|---|---|
| 424,348 A | * | 3/1890 | Pearson | F16D 69/0416 188/234 |
| 1,937,140 A | * | 11/1933 | Blume | F16D 69/0416 188/242 |

(Continued)

FOREIGN PATENT DOCUMENTS

| | | |
|---|---|---|
| CN | 1177067 A | 3/1998 |
| CN | 1890483 A | 1/2007 |

(Continued)

OTHER PUBLICATIONS

Office action issued by the China National Intellectual Property Administration (CNIPA) 201980067129.5 on Mar. 1, 2022; 9 pages.
(Continued)

*Primary Examiner* — Thomas W Irvin
(74) *Attorney, Agent, or Firm* — Reising Ethington PC

(57) ABSTRACT

A backing plate for a brake pad that helps improve attachment of the friction pad. The backing plate has a multilayered structure including a locking plate and a reinforcement plate. Locking holes or locking rings in the locking plate create an undercut portion at mold holes in the reinforcement plate to help mechanically lock the friction material of the brake pad. In some embodiments, retention holes and/or locking rails can be provided to help further retain the friction pad by increasing the available surface area for bonding. Additionally, the retention holes and/or locking rails can help decrease the weight of the backing plate by minimizing the overall size of the locking plate.

19 Claims, 7 Drawing Sheets

(52) U.S. Cl.
CPC ............... *F16D 2250/0023* (2013.01); *F16D 2250/0076* (2013.01); *F16D 2250/0084* (2013.01)

(58) Field of Classification Search
CPC ....... F16D 2069/0483; F16D 2069/005; F16D 65/092; F16D 2250/0023; F16D 2250/0076; F16D 2250/0084; F16D 2250/0015
See application file for complete search history.

(56) References Cited

U.S. PATENT DOCUMENTS

| | | | | |
|---|---|---|---|---|
| 1,941,656 | A | * | 1/1934 | Blume ................. F16D 65/092 188/234 |
| 1,950,977 | A | * | 3/1934 | Evans ................ F16D 69/0416 264/273 |
| 2,541,979 | A | * | 2/1951 | Amundsen ......... F16D 69/0408 188/246 |
| 2,885,037 | A | | 5/1959 | Wilson |
| 4,064,975 | A | * | 12/1977 | Filderman .......... F16D 69/0408 188/73.1 |
| 4,991,697 | A | | 2/1991 | Hummel et al. |
| 5,123,514 | A | | 6/1992 | Gatins, Jr. |
| 5,355,986 | A | | 10/1994 | Biswas |
| 5,388,675 | A | | 2/1995 | Kahr et al. |
| 5,413,194 | A | * | 5/1995 | Kulis, Jr. ................ F16D 65/02 188/73.1 |
| 5,429,215 | A | * | 7/1995 | King ................... F16D 69/0416 188/250 C |
| 5,499,705 | A | | 3/1996 | Ide |
| 5,515,950 | A | | 5/1996 | Kwolek |
| 5,732,800 | A | | 3/1998 | Spigener |
| 5,816,370 | A | | 10/1998 | Verbeeten et al. |
| 5,839,550 | A | | 11/1998 | Redgrave et al. |
| 5,842,546 | A | | 12/1998 | Biswas |
| 6,279,222 | B1 | | 8/2001 | Bunker et al. |
| 6,405,840 | B1 | * | 6/2002 | Foster ................. F16D 65/092 188/258 |
| 7,175,007 | B2 | | 2/2007 | Roberts |
| 7,234,573 | B2 | | 6/2007 | Kurz |
| 7,617,915 | B2 | * | 11/2009 | Augnet ................ F16D 65/092 188/250 D |
| 7,784,594 | B2 | | 8/2010 | Iwai et al. |
| 8,157,063 | B2 | | 4/2012 | Kulis, Jr. et al. |
| 8,844,686 | B2 | | 9/2014 | Muehlegger |
| 9,022,184 | B2 | | 5/2015 | Passalacqua et al. |
| 9,273,741 | B1 | | 3/2016 | Arbesman |
| 9,291,225 | B2 | | 3/2016 | Arbesman et al. |
| 9,670,976 | B2 | | 6/2017 | Arbesman et al. |
| 9,689,450 | B2 | | 6/2017 | Arbesman et al. |
| 2004/0099493 | A1 | | 5/2004 | Himmelsbach |
| 2005/0161297 | A1 | * | 7/2005 | Uwaydah ............... F16D 69/04 188/250 B |
| 2007/0107996 | A1 | | 5/2007 | Gruber et al. |
| 2008/0070048 | A1 | * | 3/2008 | Augnet ................ F16D 65/092 29/412 |
| 2008/0156601 | A1 | | 7/2008 | Himmelsbach |
| 2009/0250300 | A1 | | 10/2009 | Bosco, Jr. |
| 2010/0282565 | A1 | | 11/2010 | Erdmann et al. |
| 2012/0152667 | A1 | * | 6/2012 | Bosco, Jr. .......... F16D 65/0971 188/251 R |
| 2012/0160616 | A1 | * | 6/2012 | Passalacqua ........ F16D 69/0408 188/1.11 W |
| 2015/0159709 | A1 | * | 6/2015 | Lamb ................. F16D 69/0408 188/256 |
| 2016/0032992 | A1 | | 2/2016 | Mohseni et al. |
| 2016/0160950 | A1 | | 6/2016 | Wen |
| 2017/0152904 | A1 | * | 6/2017 | Lee ..................... F16D 65/0006 |
| 2018/0363718 | A1 | * | 12/2018 | Dresen ............... F16D 69/0408 |
| 2024/0288042 | A1 | * | 8/2024 | Savage .............. F16D 69/0408 |

FOREIGN PATENT DOCUMENTS

| | | | | |
|---|---|---|---|---|
| CN | 102575736 A | | 7/2012 | |
| CN | 104696396 A | | 6/2015 | |
| DE | 2451392 C2 | | 3/1983 | |
| DE | 19706123 A1 | | 8/1998 | |
| DE | 19754740 A1 | | 3/1999 | |
| DE | 102006041001 A1 | | 3/2008 | |
| EP | 0775842 A1 | | 5/1997 | |
| EP | 1095999 A1 | | 5/2001 | |
| GB | 805638 A | * | 12/1958 | ............. F16C 33/26 |
| GB | 1053613 A | | 1/1967 | |
| GB | 1375513 A | * | 11/1974 | ............. F16D 65/08 |
| GB | 2123908 A | * | 2/1984 | ........... F16D 65/092 |
| JP | S55139534 A | | 10/1980 | |
| JP | H1182568 A | | 3/1999 | |
| JP | H11210792 A | | 8/1999 | |
| KR | 200469893 Y1 | | 11/2013 | |
| KR | 1020180009203 A | | 1/2018 | |
| WO | WO9800650 A1 | | 1/1998 | |
| WO | WO2017177322 A1 | | 10/2017 | |

OTHER PUBLICATIONS

International Search Report and Written Opinion issued for PCT/US2019/055811 Jan. 31, 2020.
Office action issued by the German Patent Office for application DE 11 2019 005 095.8 on Mar. 16, 2022; 8 pages.

* cited by examiner

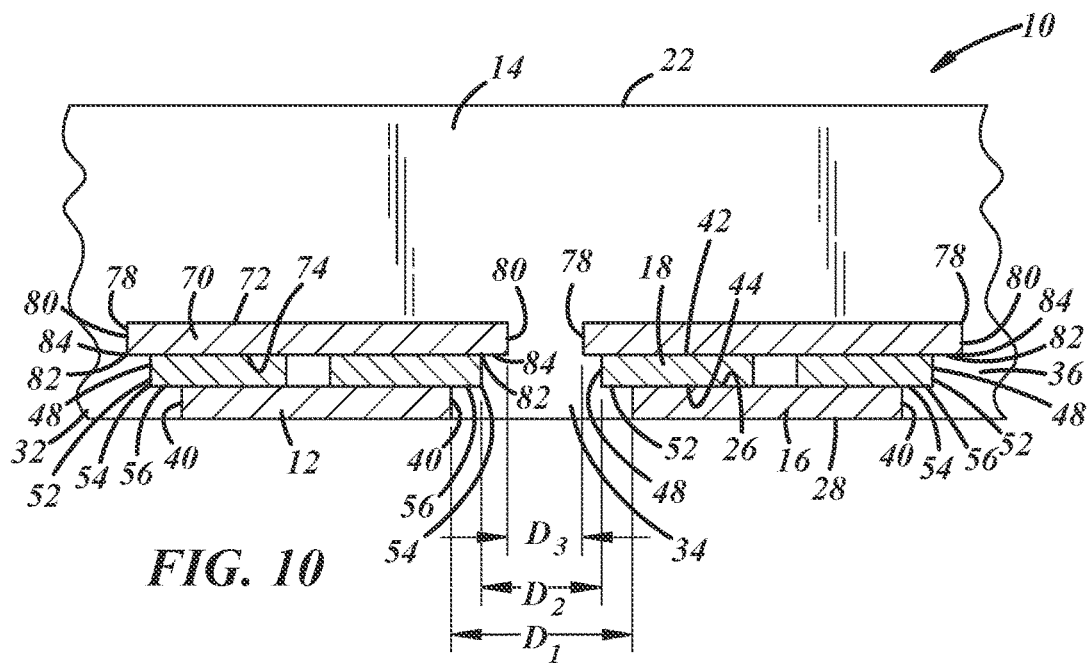
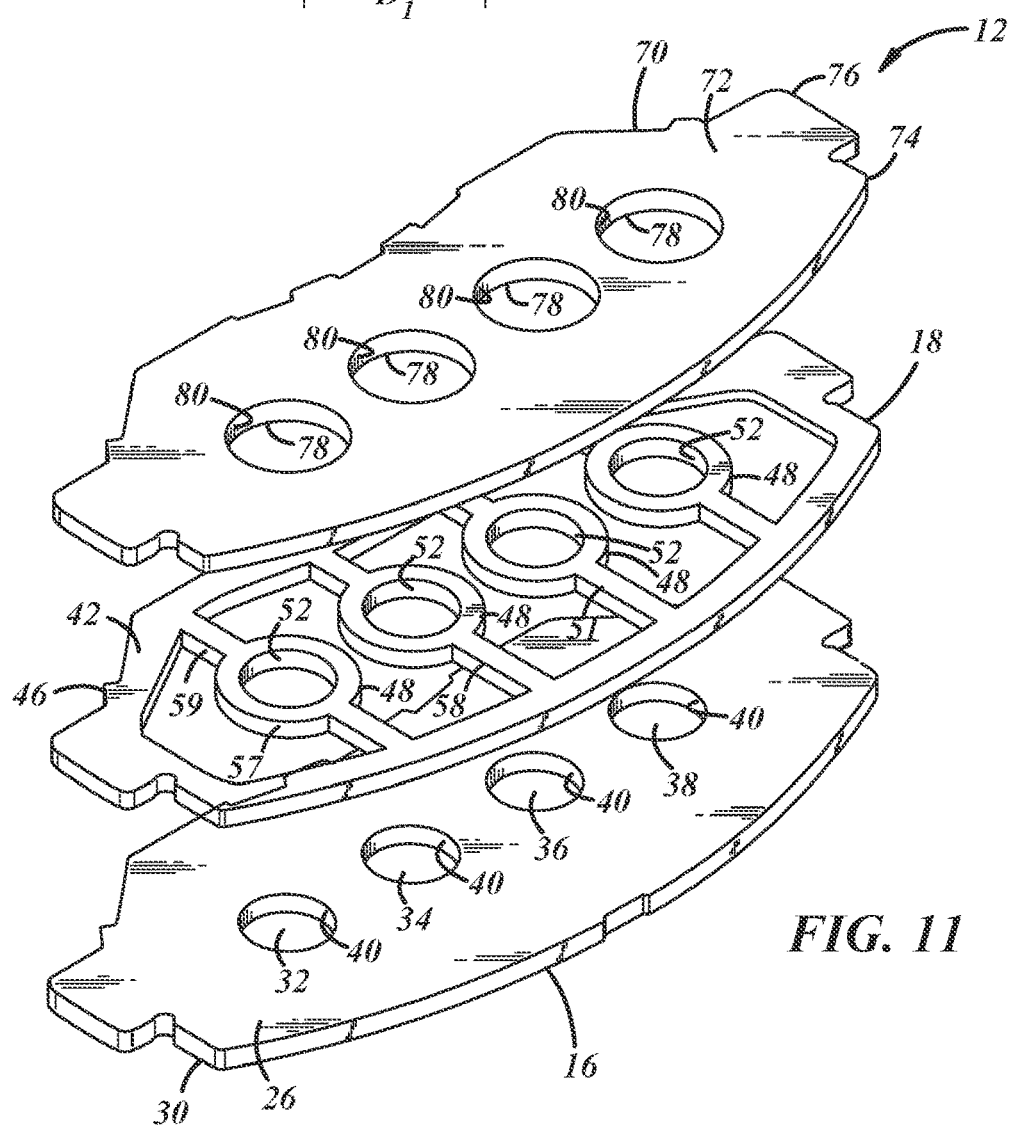

BRAKE PAD BACKING PLATE

TECHNICAL FIELD

This invention generally relates to automotive brakes and, in particular, to backing plates for automotive brake pads.

BACKGROUND

Brake pads are used in a variety of vehicles of varying size, including motorcycles, automobiles, and trucks, and generally include a backing plate and a friction pad attached to the backing plate. Mechanical locking features in the backing plate can help retain the friction material of the friction pad, thereby prolonging use of the brake pad.

SUMMARY

In accordance with one embodiment, there is provided a backing plate for a brake pad, comprising: a reinforcement plate having an outboard surface, an inboard surface, and a mold hole; and a locking plate having an outboard surface, an inboard surface, a locking hole and a retention hole. The outboard surface of the locking plate is attached to the inboard surface of the reinforcement plate such that the mold hole and the locking hole are at least partially aligned and form an undercut configured to mechanically lock friction material at an undercut portion on the outboard side of the locking plate.

In accordance with various embodiments, the backing plate may have any one or more of the following features, either singly or in any technically feasible combination:
the retention hole is at least partially defined by one or more locking rails extending from the locking hole;
the locking hole is at least partially bounded by at least two attachment portions;
each attachment portion is a weld joint;
the mold hole has a diameter and the locking hole has a diameter, and the diameter of the locking hole is about 50-95% of the diameter of the mold hole;
the locking plate is an intermediate layer between a locking layer and the reinforcement plate;
the locking layer includes a locking ring having a diameter which is smaller than a diameter of the locking hole and smaller than a diameter of the mold hole; and/or
a periphery wall of the locking ring is aligned so that it is completely within a boundary defined by a periphery wall of the locking hole, and the locking hole is aligned so that it is completely within a boundary defined by a periphery wall of the mold hole.

In accordance with one embodiment, one or more of the backing plates described above may be used with a brake pad, the brake pad comprising a friction pad having a friction surface and an attachment surface. The attachment surface is attached to the inboard surface of the locking plate and the outboard surface of the locking plate at the location of the locking hole. In another embodiment, the friction pad includes a stepped attachment surface at the mold hole.

In accordance with one embodiment, one or more of the backing plates described above may be used with a brake pad, the brake pad comprising a friction pad having a friction surface and an attachment surface. The attachment surface is attached to the inboard surface of the locking plate and the inboard surface of the reinforcement plate at the location of the retention hole.

In accordance with another embodiment, there is provided a backing plate for a brake pad, comprising: a reinforcement plate having an outboard surface, an inboard surface, and a mold hole; and a locking plate having an outboard surface, an inboard surface, a locking hole and a plurality of locking rails extending from the locking hole to the outer perimeter.

In accordance with various embodiments, the backing plate may have any one or more of the following features, either singly or in any technically feasible combination:
each locking rail of the plurality of locking rails projects from an outer diameter ring surface of the locking hole to an inner extending perimeter surface of an outer perimeter of the locking plate;
the outer diameter ring surface and the inner extending perimeter surface at least partially define a retention hole;
the locking hole has between two and seven locking rails, inclusive, extending from the outer diameter ring surface; and/or
two of the locking rails cross to form an X that is situated between the outer diameter ring surface, another outer diameter ring surface of another locking hole, and the inner extending perimeter surface.

In accordance with one embodiment, one or more of the backing plates described above may be used with a brake pad, the brake pad comprising a friction pad having a friction surface and an attachment surface. The attachment surface is attached to the inboard surface of the locking plate and the outboard surface of the locking plate at the location of the locking hole.

In accordance with another embodiment, there is provided a method of manufacturing a brake pad comprising a backing plate and a friction pad. The backing plate comprises: a reinforcement plate having an outboard surface, an inboard surface, and a mold hole; and a locking plate having an outboard surface, an inboard surface, and a locking hole. The method comprises the steps of: forming the locking hole and the retention hole in the locking plate; aligning, at least partially, the mold hole and the locking hole to form an undercut having an undercut portion on the outboard side of the locking plate; attaching the outboard surface of the locking plate to the inboard surface of the reinforcement plate; and pressing friction material against the backing plate to form the friction pad, wherein the undercut is configured to mechanically lock the friction material at the undercut portion on the outboard side of the locking plate. The forming step can include laser cutting the locking hole and the retention hole or stamping the locking hole and the retention hole.

BRIEF DESCRIPTION OF THE DRAWINGS

Preferred exemplary embodiments will hereinafter be described in conjunction with the appended drawings, wherein like designations denote like elements, and wherein:

FIG. 10 is a partial, cross-section view of a brake pad having a backing plate in accordance with another embodiment; and FIG. 11 is an exploded view of the backing plate of FIG. 10.

DETAILED DESCRIPTION

The backing plate embodiments disclosed herein may be used in various brake pad designs and in various vehicle applications to help improve attachment of the friction pad. The backing plate embodiments are multi-layered which can allow for the use of different materials in configurations to promote retention and reduce weight. The multi-layer backing plate includes a locking plate and a reinforcement plate. Locking holes in the locking plate create an undercut portion at mold holes in the reinforcement plate to help mechanically lock the friction material of the brake pad.

Figure 1:
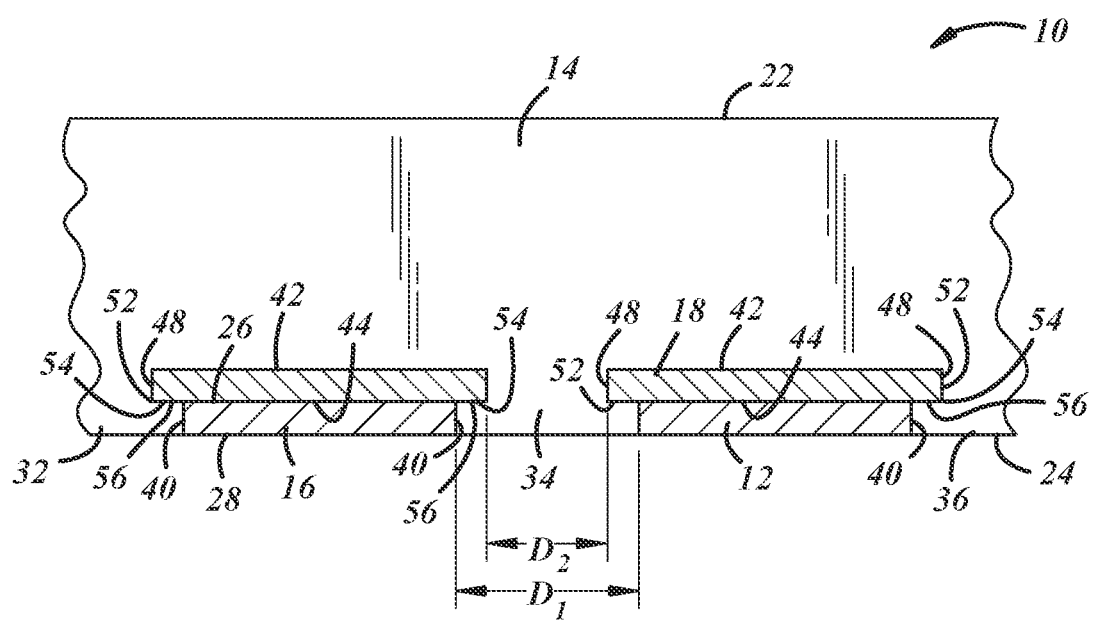
FIG. 1 is a partial, cross-section view of a brake pad having a backing plate in accordance with one embodiment.

FIG. 1 is a partial, cross-section view of a brake pad 10. The brake pad 10 includes a backing plate 12 and a friction pad 14. The illustrated configuration of the backing plate 12 and friction pad 14 are just an example, as other geometries, features, etc., may be possible depending on factors such as the caliper design. The backing plate 12 in the illustrated embodiment includes a reinforcement plate 16 and a locking plate 18 that is situated between the reinforcement plate 16 and the friction pad 14. As will be detailed further below, the backing plate 12 includes a number of features to help promote adhesion or attachment of the various components of the brake pad 10 to thereby improve the life and performance of the brake pad. Further, other features such as a dampening layer, wear indicator, etc. may also be included to help provide performance benefits.

The friction pad 14 interacts with a braking surface such as a rotor (not shown) to inhibit rotational motion and stop the vehicle. A rotor is used as an example herein to positionally describe one or more features of the brake pad 10. Accordingly, directional terms such as inboard and outboard may be used to describe whether a component faces toward a rotor (e.g., inboard) or away from a rotor (e.g., outboard) when the brake pad 10 is installed. The friction pad 14 includes an inboard-facing friction surface 22 and an outboard-facing attachment surface 24. The friction surface 22 may include features that are not illustrated, such as chamfers, slots, curved edges, etc. The attachment surface 24 opposes the locking plate 18 of the backing plate 12, although other layers such as an adhesive layer or the like may be included. The attachment surface 24 is a stepped attachment surface that generally follows the contours of the backing plate 12. The friction pad 14 may be made from any operable material, such as a non-asbestos organic (NAO) material, a ceramic material, a low metallic/low steel material (e.g., 0-30 wt % metal), a semi-metallic material (e.g., about 30-65 wt % metal), or a sintered friction material.

Typically, the friction pad 14 is directly (or indirectly via an adhesive layer) bonded to a steel backing plate or reinforcement plate 16. However, in accordance with the presently described brake pad 10, one or more other layers may be included between the reinforcement plate 16 and the friction pad 14. The reinforcement plate 16 is typically a steel plate, the configuration of which is dictated by the needs of the braking system or caliper design. Accordingly, other features, shapes, materials, etc. besides those illustrated and described may be employed for the reinforcement plate 16, such as additional caliper attachment projections, eye holes, etc., to cite a few examples.

Figure 2:
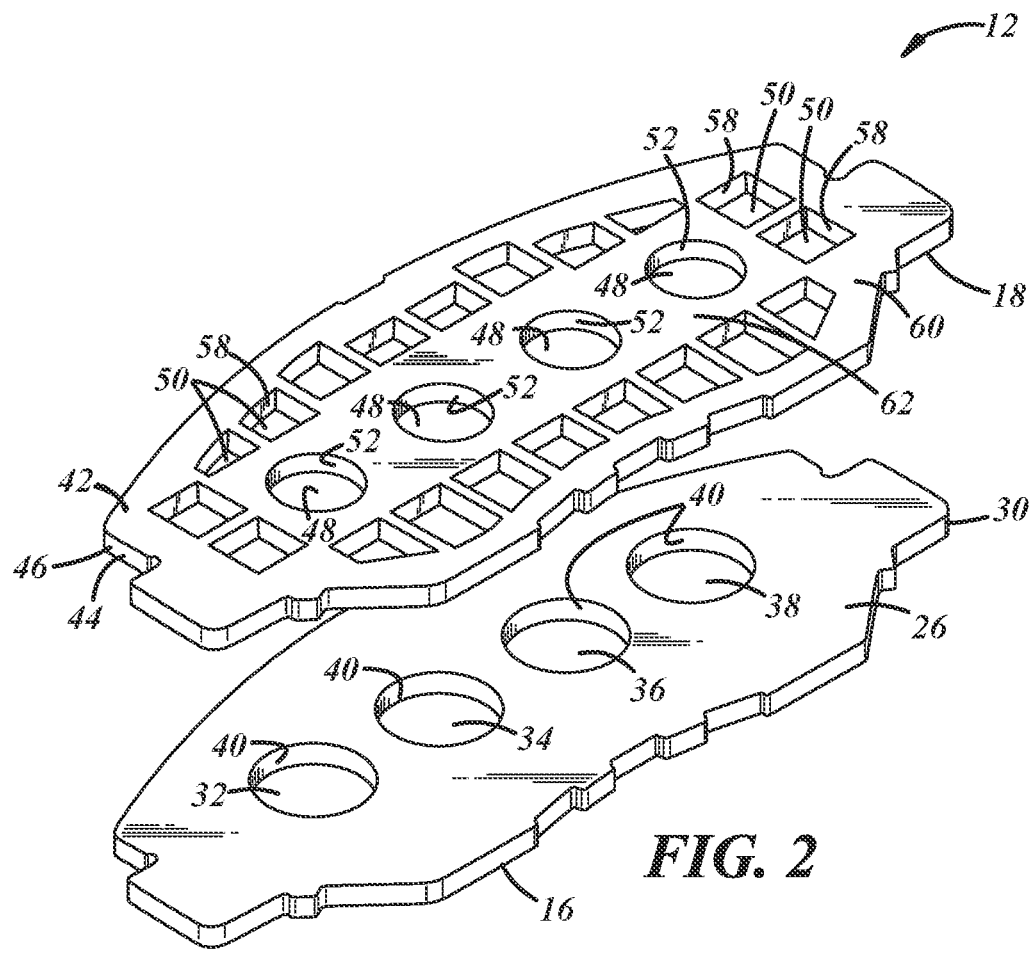
FIG. 2 is an exploded view of the backing plate of FIG. 1.
Figure 3:
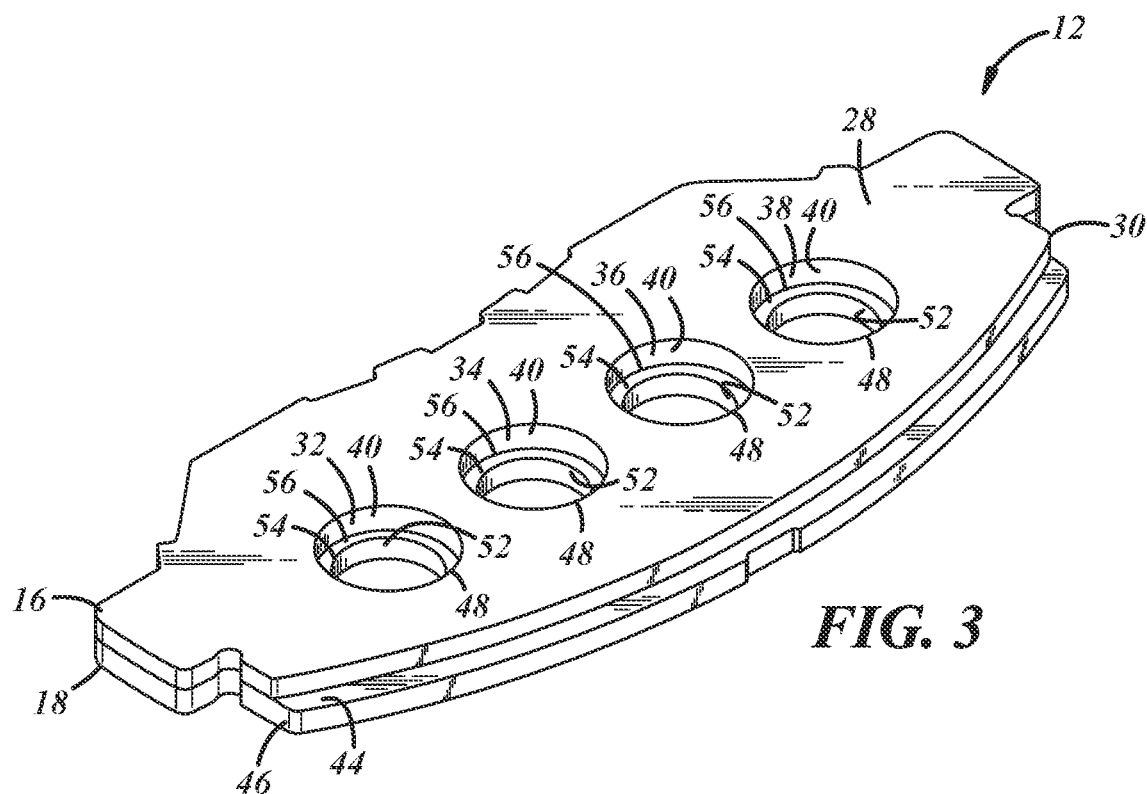
FIG. 3 shows the outboard side of the backing plate of FIGS. 1 and 2.
Figure 4:
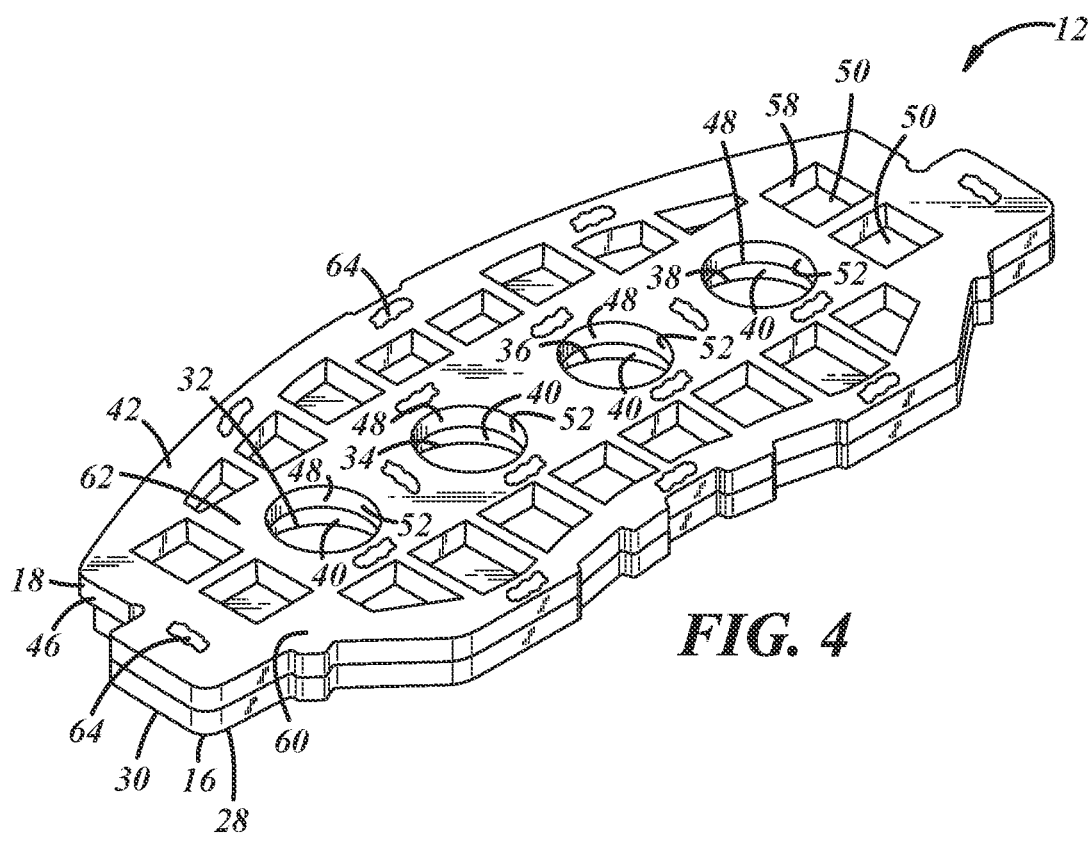
FIG. 4 shows the inboard side of the backing plate of FIGS. 1-3.
Figure 5:
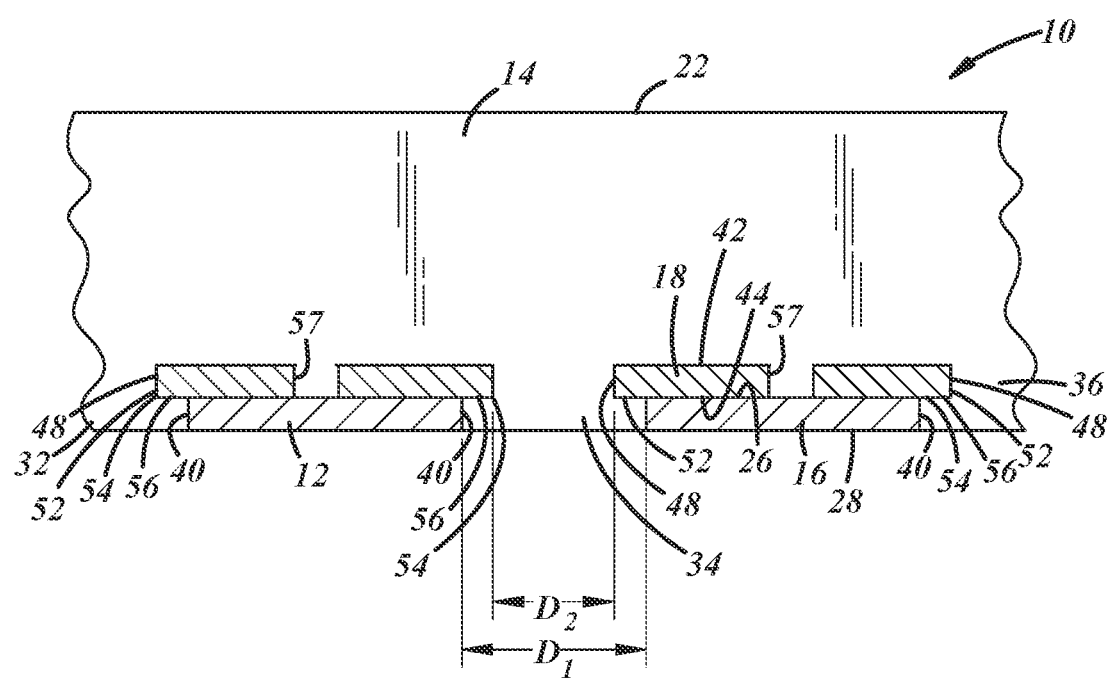
FIG. 5 is a partial, cross-section view of a brake pad having a backing plate in accordance with another embodiment.
Figure 6:
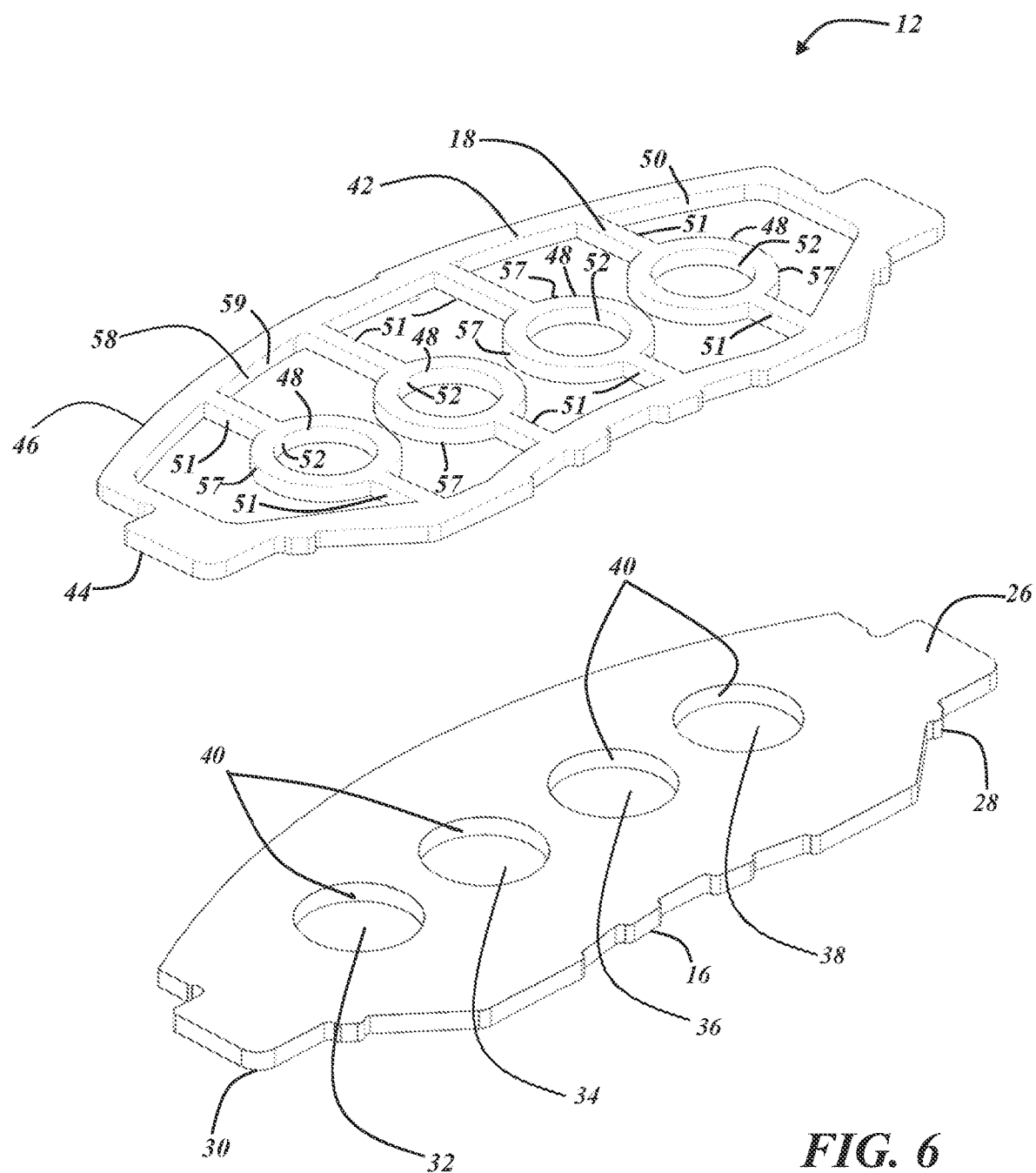
FIG. 6 is an exploded view of the backing plate of FIG. 5.
Figure 7:
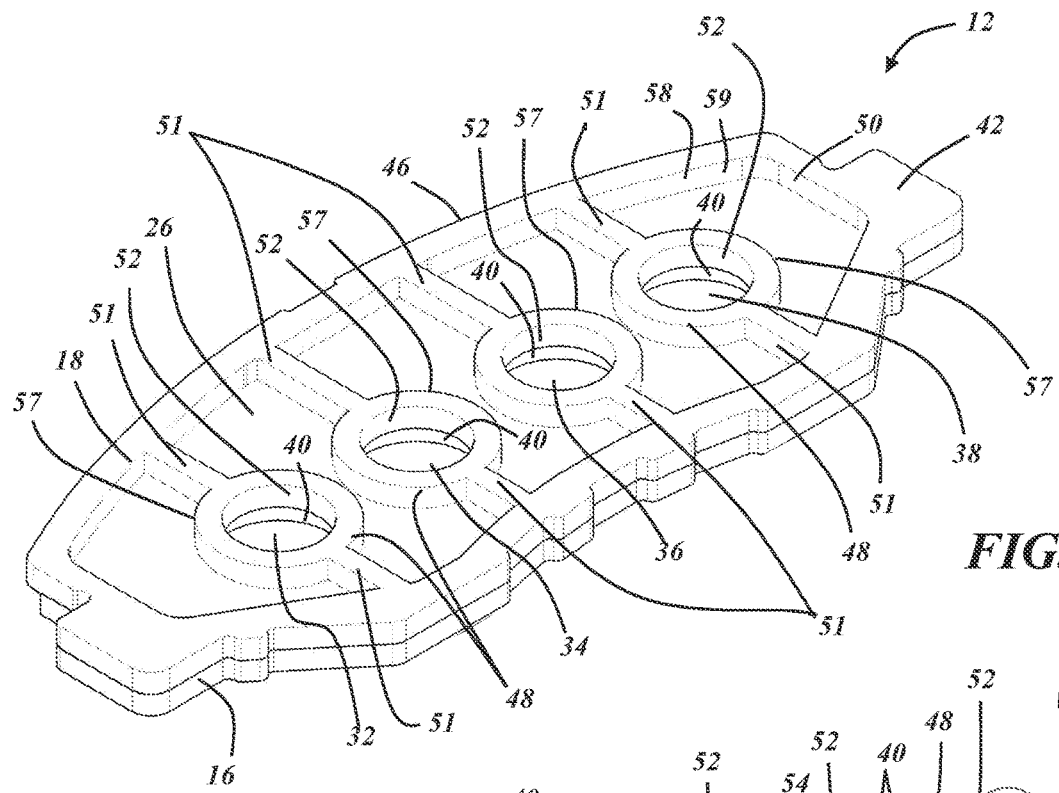
FIG. 7 shows the inboard side of the backing plate of FIGS. 5 and 6.
Figure 8:
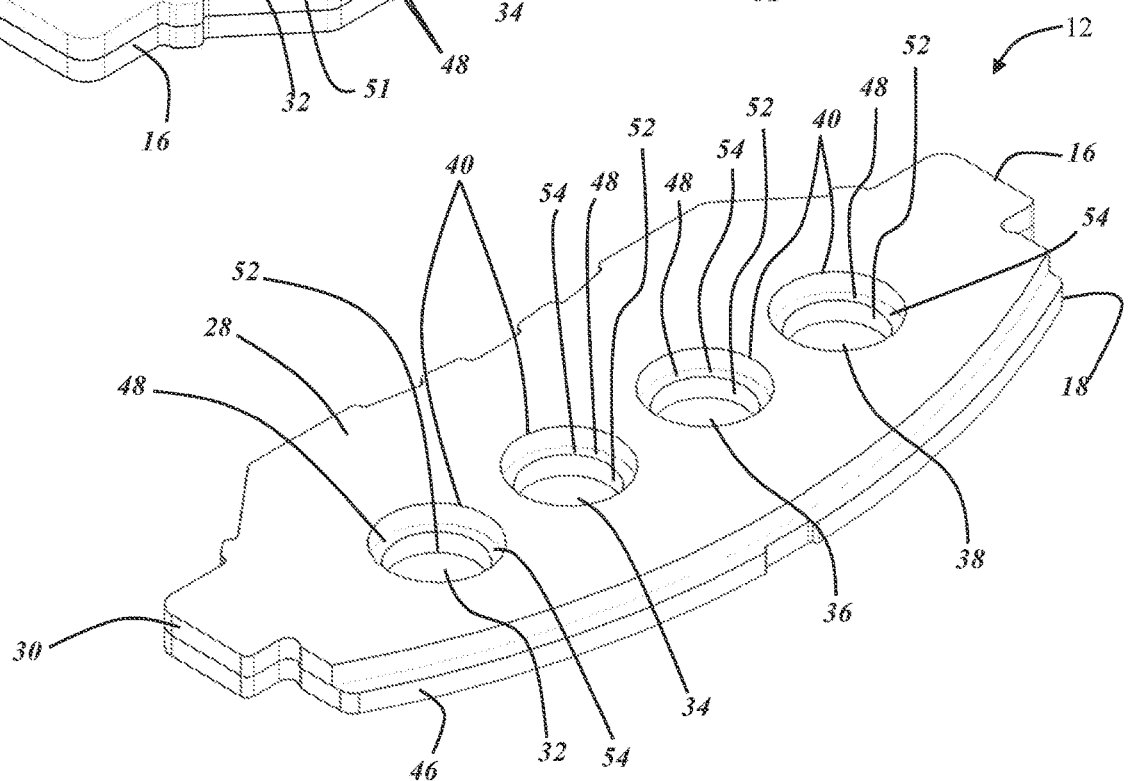
FIG. 8 shows the outboard side of the backing plate of FIGS. 5-7.

FIG. 2 is an exploded view of the backing plate 12, and FIGS. 3 and 4 show the outboard side and inboard side, respectively, of the backing plate 12. The reinforcement plate 16 has an inboard surface 26, an outboard surface 28, and an outer perimeter 30. In some embodiments, the thickness of the reinforcement plate 16 between the inboard surface 26 and the outboard surface 28 may be decreased in view of the multi-layer design, thereby decreasing weight of the brake pad 10—an industrial advantage.

The reinforcement plate 16 includes one or more mold holes 32, 34, 36, 38. While four mold holes 32-38 are shown in the illustrated embodiments, more or less may be included depending on the desired implementation. During manufacturing of the brake pad 10, the friction pad 14 is pressed such that at least some of the friction pad material is pushed though the mold holes 32-38 to help lock the friction pad and the reinforcement plate 16. Each mold hole 32-38 includes a periphery wall 40 that extends between the inboard surface 26 and the outboard surface 28 of the reinforcement plate 16. While circular mold holes 32-38 are used in this implementation, other shapes are certainly possible. Circular mold holes may be preferable in certain implementations as the friction material does not have to fill sharp corners during manufacture. Accordingly, in the illustrated embodiment, the mold holes have a diameter D1.

Embodiments of the brake pad 10 and backing plate 12 include a locking plate 18 that is generally located between the friction pad 14 and the reinforcement plate 16. The locking plate 18 includes an inboard surface 42, an outboard surface 44, and an outer perimeter 46. The thickness of the locking plate 18 between the inboard surface 42 and the outboard surface 44 may be smaller than the thickness of the reinforcement plate 16, which decreases weight of the backing plate 12. The outer perimeter 46 of the locking plate 18 may be the same size and have the same configuration as the outer perimeter 30 of the reinforcement plate 16. However, as seen in FIG. 4, the outer perimeter 46 of the locking plate 18 is slightly larger than the outer perimeter 30 of the reinforcement plate 16 along the top edge, and accordingly, it may be desirable to include alignment notches or the like in the locking plate 18 as well as in the reinforcement plate 16. In other embodiments, the outer perimeter 46 of the locking plate 18 is smaller than the outer perimeter 30 of the reinforcement plate 16. In a preferred embodiment, the locking plate 18 is made from a lighter weight material such as aluminum or an aluminum alloy, although other materials are certainly possible. The locking plate 18 includes various features to help promote attachment of the other components of the brake pad 10, such features including locking holes 48 and retention holes 50 (only a few of each are numbered for clarity purposes).

Locking holes 48 in the locking plate 18 increase the amount of interlockable surface area available for bonding the friction pad 14. The locking holes 48 in the locking plate 18 may be laser cut into the locking plate 18, and they are located such that they are at least partially aligned with the mold holes 32-38 of the reinforcement plate 16. Laser cutting may allow for more precisely shaped locking features such as sloped or angled peripheral walls. In another embodiment, the various locking features are stamped into the locking plate 18. In the illustrated embodiment, the locking holes 48 have a periphery wall 52 that is aligned so it is completely within a boundary defined by the periphery wall 40 of each of the mold holes 32-38. This arrangement can maximize the amount of interlockable surface area. Further, the locking holes 48 have a diameter D2 which is smaller than the diameter D1 of the mold holes 32-38. This diameter difference (D1–D2), as well as the alignment, circumscribes this amount of interlockable surface area. Further, the arrangement of each locking hole 48 forms an undercut 54 configured to mechanically lock the friction material from the friction pad 14 at an undercut portion 56 on the outboard side 44 of the locking plate 18. The difference between D1 and D2 will vary depending on the braking system requirements, the overall size of the backing plate 12, etc. In one embodiment, D2 may be about 50-95% or 70-90% of D1 (e.g., if D1 is 1.5 mm, D2 would be 0.75-1.425 mm or 1.05-1.35 mm). The undercut 54 and undercut portion 56 result in the formation of a stepped attachment surface 24 in the friction pad at each of the mold holes 32-38.

Retention holes 50 in the locking plate 18 may also increase the amount of interlockable surface area, but advantageously, the retention holes 50 serve to decrease the weight of the locking plate 18. The retention holes 50 may be laser cut or stamped into the locking plate 18, similar to the locking holes 48. In some embodiments, a periphery wall 58 of each retention hole is angled with respect to a line normal to the outboard surface 44 to create an additional undercut portion for interlocking the friction material of friction pad 14. The retention holes 50 are located in an exterior portion 60 of the locking plate 18 that is closer to the outer perimeter 46 than an interior portion 62 where the locking holes 48 are located. Accordingly, in this embodiment, the locking holes 48 in the interior portion 62 are generally surrounded by a plurality of retention holes 50 in the exterior portion 60. In other embodiments, some retention holes 50 may be located in the interior portion 62 (e.g., between the locking holes 48).

With particular reference to FIG. 4, the locking plate 18 is attached to the reinforcement plate 16 at attachment portions 64 (only a few of which are labeled for clarity purposes). Some embodiments, however, may not have distinct attachment portions, as the locking plate 18 may be attached to the reinforcement plate 16 via an adhesive layer or the like. In the illustrated embodiment, the attachment portions 64 are weld joints. In a preferred embodiment, the attachment portions 64 are laser weld seams. However, other welding methods are possible, such as resistance welding, capacitive discharge welding, etc. Configurationally, a number of the attachment portions 64 or weld joints are located in the exterior portion 60 between the outer perimeter 46 and the retention holes 50. Also, a number of the attachment portions 64 or weld joints are located in the interior portion 62 to at least partially surround the locking holes 48. Preferably, each locking hole 48 is at least partially bounded by two or more attachment portions 64, and also, more centrally located locking holes 48 are at least partially bounded by three or more attachment portions 64. With laser weld joints, it is preferable for the weld seams to be oriented such that they are generally parallel to the outer perimeter 46. This provides greater attachment force along the edges of the backing plate 12. The number and configuration of the attachment portions 64 may vary from what is illustrated, and will likely depend on various characteristics such as the size of the backing plate 12 and/or the materials for the reinforcement plate 16 and the locking plate 18.

In the embodiments illustrated in FIGS. 5-11, the locking plate 18 includes a plurality of locking rails 51 which extend from the locking holes 48 to the outer perimeter 46. More particularly, each locking rail 51 extends or projects from an outer diameter ring surface 57 of each locking hole 48. The outer diameter ring surface 57 is generally orthogonal to both the inboard and outboard surfaces 42, 44 of the locking plate 18. It is possible, however, for the outer diameter ring surface 57 to be generally inclined toward the reinforcement plate 16, to provide an additional undercut for interlocking friction material. Each locking rail 51 is directly attached to the outer diameter ring surface 57 of each locking hole 48, and then projects to an inner extending perimeter surface 59 of the outer perimeter 46. As with the outer diameter ring surface 57, the inner extending perimeter surface 59 is generally orthogonal to both the inboard and outboard surfaces 42, 44 of the locking plate 18. Further, it is possible for the inner extending perimeter surface 59 to be generally inclined toward the reinforcement plate 16, to provide an additional undercut for interlocking friction material. Both the outer diameter ring surface 57 and the inner extending perimeter surface 59 generally define a plurality of retention holes 50, each having a peripheral wall 58 (only one of which is labeled for clarity purposes).

Figure 9:
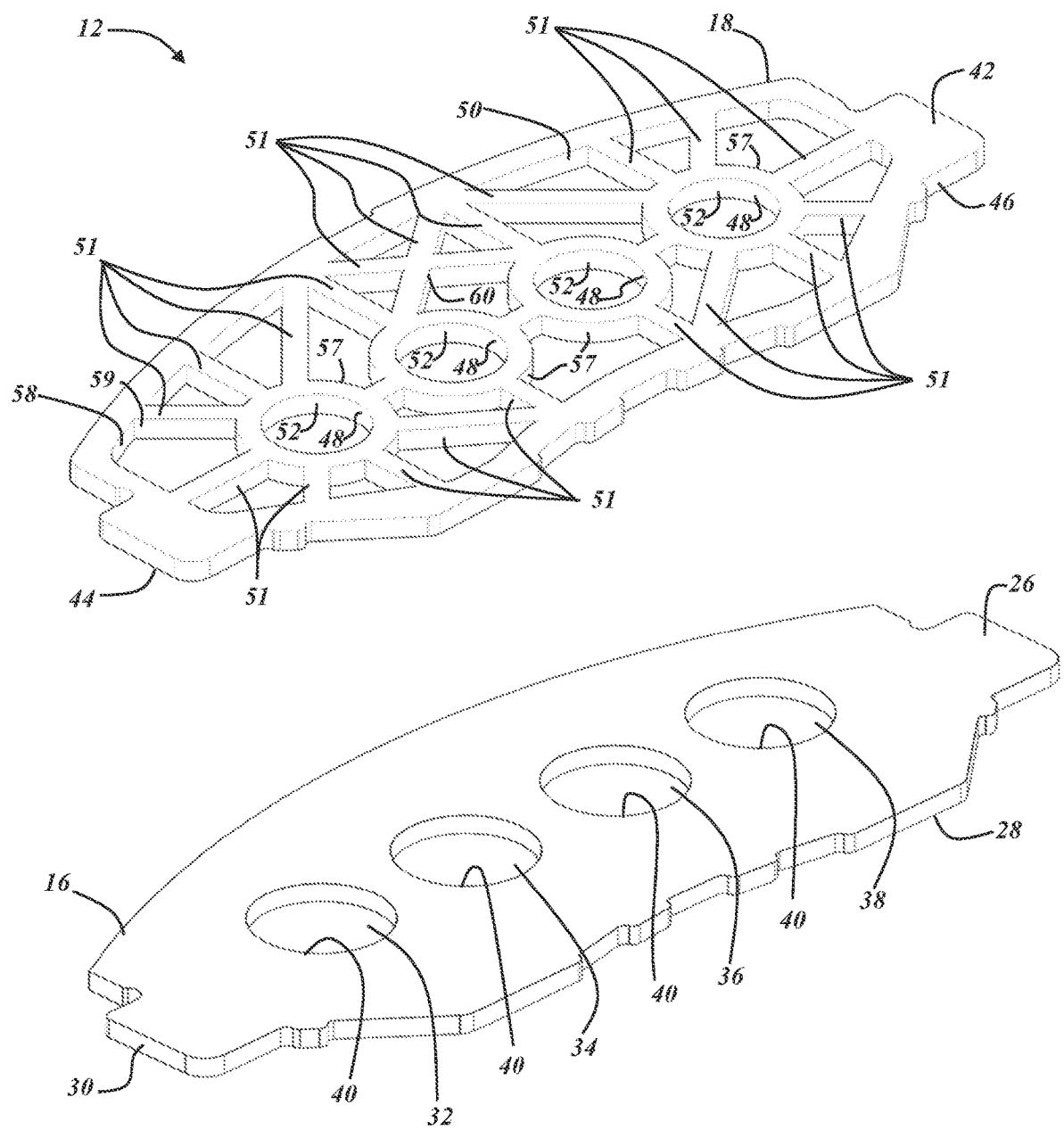
FIG. 9 is an exploded view of another embodiment of a backing plate.

In advantageous embodiments, as illustrated more particularly in FIGS. 6, 7, 9, and 11, each locking hole 48 has between two and seven locking rails 51 (inclusive) extending from each outer diameter ring surface 57. Between two and seven locking rails 51 per locking hole 48 is advantageous in that it allows for the formation of larger void spaces between the outer diameter ring surfaces 57 and the inner extending perimeter surface 59, which can decrease the weight of the locking plate 18 and ultimately the weight of the backing plate 12 and brake pad 10. Further, between two and seven locking rails 51 per locking hole 48 can help provide sufficient structural integrity to support the locking holes 48 with respect to the outer perimeter 46. In a further advantageous embodiment, at least some locking rails 51 extend along a projected radii from each locking hole 48 until they meet at the inner extending perimeter surface 59. In other words, at least some locking rails 51 are continuous extensions of radii from the corresponding locking hole 48. For example, in the embodiment illustrated in FIG. 6, the locking plate 18 includes two diametrically opposing radially extending locking rails 51 for each locking hole 48. It is also possible to have locking rails 51 that extend in other orientations, such as the two locking rails 51 that cross to form an X 60 between two outer diameter ring surfaces 57 and the inner extending perimeter surface 59, as illustrated in FIG. 9. Other projecting configurations for the locking rails 51 with respect to the locking holes 48 and the outer perimeter 46 are certainly possible. Increasing the number of locking rails 51 increases the number of retention holes 50.

FIGS. 10 and 11 illustrate another embodiment of a brake pad 10 and a backing plate 12. In this embodiment, there is an extra locking layer 70 located adjacent the inboard surface 42 of the locking plate 18. Accordingly, in this embodiment, the locking plate 18 is an intermediate layer between the locking layer 70 and the reinforcement plate 16, and it generally has the same configuration as the locking plate 18 illustrated in FIG. 6. The extra locking layer 70 may also be used with the other locking plate embodiments, such as those illustrated in FIGS. 2 and 9. The extra locking layer 70 includes an inboard surface 72, an outboard surface 74, and an outer perimeter 76. Locking rings 78 cooperate with the mold holes 32-38 of the reinforcement plate 16 and the locking holes 48 of the locking plate 18. In the illustrated embodiment, locking rings 78 have a periphery wall 80 with a diameter D3 which is smaller than the diameter D2 of the locking hole 48 and the diameter D1 of each of the mold holes 32-38. This configuration and alignment of the locking rings 78, the locking holes 48, and the mold holes 32-38 provides an additional undercut 82 and undercut portion 84 to increase the interlockable surface area available for locking the friction pad 14. D3 may be about 50-95% or 70-90% of D2 or D1, and will likely depend on the size of D1 and D2 as well as the size differential between D2 and D1. The periphery wall 80 that is aligned so that it is completely within the bounds of the periphery wall 52 of each of the locking holes 48, as well as the periphery wall 40 of each of the mold holes 32-38. This arrangement can maximize the amount of interlockable surface area. The undercuts 54, 82 and undercut portions 56, 84 result in the formation of a stepped attachment surface 24 in the friction pad at each of the mold holes 32-38, with this embodiment having more steps than the two-layer embodiments illustrated in the other figures.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A backing plate for a brake pad, comprising:
a reinforcement plate plate having an outer perimeter, an outboard surface, an inboard surface, and a mold hole; and
a locking plate having an outer perimeter, an outboard surface, an inboard surface, a locking hole and a retention hole, wherein the outboard surface of the locking plate is attached to the inboard surface of the reinforcement plate such that the mold hole and the locking hole are at least partially aligned and form an undercut configured to mechanically lock friction material at an undercut portion on the outboard side of the locking plate, wherein the outer perimeter of the reinforcement plate is at least partially aligned with the outer perimeter of the locking plate.

2. The backing plate of claim 1, wherein the retention hole is at least partially defined by one or more locking rails extending from the locking hole.

3. The backing plate of claim 1, wherein the locking hole is at least partially bounded by at least two attachment portions.

4. The backing plate of claim 3, wherein each attachment portion is a weld joint.

5. The backing plate of claim 1, wherein the mold hole has a diameter and the locking hole has a diameter, and the diameter of the locking hole is about 50-95% of the diameter of the mold hole.

6. The backing plate of claim 1, wherein the locking plate is an intermediate layer between a locking layer and the reinforcement plate.

7. The backing plate of claim 6, wherein the locking layer includes a locking ring having a diameter which is smaller than a diameter of the locking hole and smaller than a diameter of the mold hole.

8. The backing plate of claim 7, wherein a periphery wall of the locking ring is aligned so that it is completely within a boundary defined by a periphery wall of the locking hole, and the locking hole is aligned so that it is completely within a boundary defined by a periphery wall of the mold hole.

9. A brake pad, comprising:
the backing plate of claim 1; and
a friction pad having a friction surface and an attachment surface, wherein the attachment surface is attached to the inboard surface of the locking plate and the outboard surface of the locking plate at the location of the locking hole.

10. The brake pad of claim 9, wherein the friction pad includes a stepped attachment surface at the mold hole.

11. A brake pad, comprising:
the backing plate of claim 1; and a friction pad having a friction surface and an attachment surface, wherein the attachment surface is attached to the inboard surface of the locking plate and the inboard surface of the reinforcement plate at the location of the retention hole.

12. A method of manufacturing a brake pad comprising the backing plate of claim 1 and a friction pad, wherein the method comprises the steps of:
forming the locking hole and the retention hole in the locking plate;
aligning, at least partially, the mold hole and the locking hole to form an undercut having an undercut portion on the outboard side of the locking plate;
attaching the outboard surface of the locking plate to the inboard surface of the reinforcement plate; and
pressing friction material against the backing plate to form the friction pad, wherein the undercut is configured to mechanically lock the friction material at the undercut portion on the outboard side of the locking plate.

13. The method of claim 12, wherein the forming step includes stamping or laser cutting the locking hole and the retention hole.

14. A backing plate for a brake pad, comprising:
a reinforcement plate having an outer perimeter, an outboard surface, an inboard surface, and a mold hole; and
a locking plate having an outer perimeter, an outboard surface, an inboard surface, a locking hole and a plurality of locking rails extending from the locking hole to the outer perimeter, wherein each locking rail of the plurality of locking rails projects from an outer diameter ring surface of the locking hole of the outer perimeter of the locking plate, wherein the outer perimeter of the reinforcement plate is at least partially aligned with the outer perimeter of the locking plate.

15. The backing plate of claim 14, wherein the outer diameter ring surface and an inner extending perimeter surface at least partially define a retention hole.

16. The backing plate of claim 14, wherein the locking hole has between two and seven locking rails, inclusive, extending from the outer diameter ring surface.

17. The backing plate of claim 16, wherein two of the locking rails cross to form an X that is situated between the outer diameter ring surface, another outer diameter ring surface of another locking hole, and the inner extending perimeter surface.

18. A brake pad, comprising:
the backing plate of claim 14; and
a friction pad having a friction surface and an attachment surface, wherein the attachment surface is attached to the inboard surface of the locking plate and the outboard surface of the locking plate at the location of the locking hole.

19. A backing plate for a brake pad, comprising:
a reinforcement plate being made of steel, the reinforcement plate having an outboard surface, an inboard surface, and a mold hole; and
a locking plate being made of aluminum or an aluminum alloy, the locking plate having an outboard surface, an inboard surface, a locking hole and a retention hole, wherein the outboard surface of the locking plate is attached to the inboard surface of the reinforcement plate such that the mold hole and the locking hole are at least partially aligned and form an undercut configured to mechanically lock friction material at an undercut portion on the outboard side of the locking plate.

* * * * *